United States Patent [19]

Ewen et al.

[11] Patent Number: 5,122,583
[45] Date of Patent: Jun. 16, 1992

[54] EFFICIENCY OF A PRE-POLYMERIZED CATALYST

[75] Inventors: John A. Ewen; Alan H. Bitzer, both of Houston; David L. Gressett, Galena Park; Herbert G. Hummel, Pasadena, all of Tex.

[73] Assignee: Fina Technology, Inc., Dallas, Tex.

[21] Appl. No.: 615,079

[22] Filed: Nov. 19, 1990

Related U.S. Application Data

[63] Continuation of Ser. No. 9,711, Feb. 2, 1987, abandoned.

[51] Int. Cl.⁵ .............................................. C08F 4/64
[52] U.S. Cl. ................................... 526/125; 526/124; 526/127; 526/159; 526/351; 526/128; 502/104; 502/108
[58] Field of Search ............... 526/90, 124, 125, 127, 526/159, 128

[56] References Cited

U.S. PATENT DOCUMENTS

| | | | |
|---|---|---|---|
| 4,200,717 | 4/1980 | Abe et al. | 526/159 |
| 4,540,679 | 9/1985 | Arzoumanidis et al. | 526/124 X |
| 4,567,155 | 1/1986 | Tovrog et al. | 526/125 X |
| 4,579,836 | 4/1986 | Arzoumanidis et al. | 502/133 |
| 4,581,342 | 4/1986 | Johnson et al. | 502/119 |
| 4,612,299 | 9/1986 | Arzoumanidis et al. | 526/124 X |
| 4,657,882 | 4/1987 | Karayannis et al. | 526/125 X |

*Primary Examiner*—Patrick P. Garvin
*Attorney, Agent, or Firm*—Jim D. Wheelington; William D. Jackson; John K. Abokhair

[57] ABSTRACT

The invention provides a process for increasing the efficiency of pre-polymerized catalysts used in the polymerization of olefins. The invention includes contacting a pre-polymerized catalyst with a cocatalyst or a mixture of cocatalyst and an electron donor prior to introducing the catalyst into a polymerization reaction zone.

31 Claims, No Drawings

5,122,583

EFFICIENCY OF A PRE-POLYMERIZED CATALYST

This application is a continuation of application Ser. No. 009,711, filed Feb. 2, 1987, now abandoned.

TECHNICAL FIELD

This invention relates to a process for increasing the efficiency of a pre-polymerized catalyst used in the polymerization of olefins. The catalyst is contacted with a cocatalyst prior to the introduction of the catalyst into a polymerization reaction zone. The catalyst may also be contacted with an electron donor compound simultaneously with or after the contact of the catalyst with the cocatalyst and prior to the introduction into the reaction zone.

BACKGROUND

Catalysts for the polymerization of olefins are well known in the art and have been known at least since U.S. Pat. No. 3,113,115 which described the basic Ziegler catalyst. Since that time, scores of patents have issued relating to new or improved Ziegler-type catalysts. Examples of these patents include U.S. Pat. Nos. 3,793,295; 3,850,342; 4,107,413; 4,294,721; 4,187,196, 4,226,741; 4,390,454; 4,495,338; 4,439,540; and 4,547,476. The disclosures of which, together with the disclosure of U.S. Pat. No. 3,113,115, are hereby incorporated by reference.

These patents disclose Ziegler-type catalysts that are basically a complex derived from a halide of a transition metal, for example, titanium, chromium and vanadium and a metal hydride or a metal alkyl, typically an organoaluminum compound which serves as a cocatalyst. Usually, the catalyst includes a titanium halide compound which is supported on a magnesium halide complexed with an alkyl aluminum. Also employed with Zeigler-type catalysts are electron donors or Lewis bases which aid in controlling the sterospecificity of the polymer.

It has also become known in the art that the efficiency of these types of catalysts may be significantly increased by pre-coating them with a polymeric substance in a pre-polymerization step prior to introducing the catalyst into a polymerization reaction zone. Methods for pre-coating or pre-polymerizing olefin catalysts are disclosed in U.S. Pat. Nos. 3,893,989; 4,200,717; 4,287,328; 4,316,966 and British Patent No. 1,580,635, the disclosures of which are hereby incorporated by reference. Other methods are also known in the art. All of the methods for pre-polymerizing are essentially a polymerization reaction on a small scale. The polymer product in the pre-polymerization attaches to or coats the catalyst as the polymer is formed. By pre-polymerizing, it is believed that the number of activated sites on the catalyst is increased and the morphology of the catalyst is protected as the catalyst enters a polymerization reaction zone. Instead of disintegrating upon entering the reaction zone, the catalyst is held together by the pre-polymerizing, thereby increasing the effective volume within the reactor and reducing negative downstream effects. Pre-polymerizing also enables better isotactic control of the polymer product and provides a product with better bulk density.

It has been surprisingly found that the efficiency of these pre-polymerized catalysts can be increased even further by contacting the pre-polymerized catalyst with a cocatalyst or a mixture of cocatalyst and electron donor prior to the catalyst entering the reaction zone as taught by the present invention. Increases in efficiency of almost 10,000 (gms product/gm catalyst for 2 hours) have been achieved, and further increases are possible.

SUMMARY OF THE INVENTION

The invention provides a process for increasing the efficiency of pre-polymerized catalysts that are used in the polymerization of olefins, particularly propylene. In one embodiment, the invention comprises contacting a pre-polymerized catalyst with a cocatalyst and introducing the catalyst into a polymerization reaction zone which contains a monomer solution. A preferred embodiment includes contacting the pre-polymerized catalyst with a stream of cocatalyst and using the stream to carry the catalyst into the reaction zone.

In another embodiment, the invention comprises contacting the pre-polymerized catalyst with the cocatalyst and an electron donor compound. The electron donor compound may be mixed with the cocatalyst or added after the catalyst has contacted the reaction zone. It is preferred to have a mixed stream of cocatalyst and electron donor contact the catalyst and carry the catalyst into the reaction zone. Alternatively, the catalyst may first contact a stream of cocatalyst and then a stream of electron donor compound.

In another embodiment of the invention, a catalyst is pre-polymerized by contacting the catalyst with a cocatalyst, an electron donor and a monomer. The catalyst is washed with an organic solvent such as hexane or heptane. The catalyst is then contacted again with a cocatalyst prior to introducing the catalyst into the reaction zone. Additionally, the catalyst may be contacted with an electron donor simultaneously with or after the contact with the cocatalyst but prior to the introduction of the catalyst into the reaction zone.

In the pre-polymerization step, the catalyst may be coated with a polymer product such that the weight ratio of polymer/catalyst is approximately 0.1-100. Preferably, the ratio of coating to catalyst is less than 10. The preferred monomer is propylene.

The preferred catalyst is a Ziegler-type catalyst and is a complex derived from a transition metal halide and a metal hydride of a metal alkyl. The preferred cocatalyst is an alkylaluminum compound, and most preferably triethylaluminum. The preferred electron donor is an organic silicon compound.

DETAILED DESCRIPTION

The present invention provides a process for significantly increasing the efficiency of a pre-polymerized catalyst that is used in the polymerization of olefins. The invention is particularly adapted for increasing the catalyst efficiency in the polymerization of propylene. The invention includes contacting the pre-polymerized catalyst with a cocatalyst and then introducing the catalyst into a polymerization reaction zone. Another embodiment of the invention includes contacting the pre-polymerized catalyst with an electron donor compound simultaneously with or following the contact of the catalyst with the cocatalyst. In a preferred embodiment, the pre-polymerized catalyst is introduced into a stream of diluted cocatalyst and electron donor, and the contact between the catalyst and the cocatalyst and electron donor occurs as the stream carries the catalyst into the reaction zone. Test results show an increase in efficiency of the pre-polymerized catalyst of up to 10,000 (gms polymer product/gm catalyst in two hours) or more when it is contacted with the cocatalyst and electron donor as taught by the present invention as opposed to adding the pre-polymerized catalyst directly to the reaction zone. Similar results are obtained when the catalyst is contacted only with the cocatalyst without the presence of the electron donor.

The type of catalyst contemplated for use in the present invention is generally a Ziegler-type catalyst. These catalysts can be generally defined as a complex derived from a transition metal halide and a metal hydride or a metal alkyl. These catalysts typically include a titanium chloride compound such as titanium tetrachloride, titanium trichloride or a titanium dialkyl chloride that is supported on a magnesium dichloride or on an organic magnesium compound. Additionally, the catalyst support may include complexes of silicon, aluminum and organic magnesium compounds.

A cocatalyst is utilized to aid in the activation of the catalyst for the polymerization reaction. The most commonly used cocatalyst is an organoaluminum compound which is usually an alkyl aluminum. The preferred cocatalyst is triethylaluminum ("TEAl"). Other examples of organoaluminum compounds usable in the present invention are an alkylaluminum dihalide, a trialkoxyaluminum dialkylaluminum halide, and a triisobutylaluminum.

Also utilized in the invention is a steroregulator commonly referred to as an electron donor or Lewis base. Examples of useful electron donors include: amines, amides, ethers, ketones, nitriles, phosphines, stibines, arsines, phosphoramides, thioethers, thioesters, aldehydes, alcoholates, amides and salts of organic acids. In the preferred embodiment, the electron donor acts as a stereoregulator or stereospecifier to produce a polymer product with a high isotactic index. Some examples include the esters of carboxylic, alkoxy or amino acids, and the esters of aromatic acids. A preferred electron donor is an organic silicon compound, for example, diphenyldimethoxysilane ("DPMS").

In order to increase the efficiency of the catalyst, the catalyst is pre-polymerized using any of the several methods known and used in the industry. Basically, the pre-polymerization reaction occurs as a monomer is introduced into a mixture of catalyst, cocatalyst and electron donor. The monomer is polymerized, and in so doing, it adheres to the surface of the catalyst and forms a coating.

In pre-polymerizing the catalyst, a weight ratio of polymer/catalyst of approximately .0.1–100 is desirable. Preferably, the weight ratio of polymer to catalyst is less than 10. A higher weight ratio results in a greater volume occupied by the pre-polymerized catalyst. A ratio of polymer coating less than 2 still provides acceptable increases in the efficiency of the catalyst, but the bulk density of the polymer product is reduced. Therefore, the preferred range of polymer coating to catalyst is 2–10. As an optional step, the pre-polymerized catalyst may be washed with an organic solvent such as hexane or heptane to remove excess cocatalyst and enable the catalyst to be placed in drums in a slurry form for storage and transport.

According to one embodiment of the invention, the pre-polymerized catalyst is contacted with a cocatalyst and then is introduced into a polymerization reaction zone which contains a monomer solution, a cocatalyst and an electron donor compound. Typically, these will be the same compounds as were used in the pre-polymerization step. In a preferred embodiment, the contact of the catalyst with the cocatalyst occurs as the catalyst is fed into a diluted stream of cocatalyst which carried the catalyst into the reaction zone. The catalyst may be fed into the stream of cocatalyst in a continuous or periodic manner. The contact can take place in a pipe which carries the cocatalyst as there is no need for a mixing chamber. The contact time or residence time of the catalyst in the pipe need be only a few seconds. Two seconds of pre-contact between the pre-polymerized catalyst and the cocatalyst is sufficient to significantly increase the efficiency of the catalyst. The concentration of cocatalyst in the stream may be varied as the cocatalyst is diluted and flushed with hexane, heptane or a similar organic solvent. A preferred concentration would be 10–30% cocatalyst. Lower concentrations may be used as even a small amount of cocatalyst contacted a second time with the catalyst will increase the efficiency of the catalyst. Higher concentrations may also be used as, to a point, the more cocatalyst that is contacted with the catalyst before entering the reaction zone, the greater the efficiency. All of the cocatalyst necessary for the polymerization reaction in the reaction zone need not be fed through this contact pipe. A portion of the desired amount of cocatalyst in the reactor may be added directly to the reaction zone.

Another embodiment of the invention provides for the pre-polymerized catalyst to be contacted with a cocatalyst and an electron donor before entering the reaction zone. The electron donor may be contacted with the catalyst simultaneously with the cocatalyst or following the contact with the cocatalyst. Most electron donors require that the cocatalyst contact the catalyst before or simultaneously with the electron donor as the electron donor will poison the catalyst if it contacts it before the cocatalyst. In a preferred embodiment, the catalyst is fed into a stream containing diluted cocatalyst and electron donor compounds, and the stream acts to carry the catalyst into the reaction zone. In the alternative, the catalyst may be fed into a stream of dilute cocatalyst which then contacts a stream of dilute electron donor prior to entering the reaction zone.

The following Examples and Comparative Examples illustrate the present invention in more detail and the advantages to be gained in increased catalyst efficiency as compared with introducing a pre-polymerized catalyst into a reaction zone without pre-contacting with a cocatalyst and an electron donor. The results are summarized in Table-1.

EXAMPLE 1

Pre-polymerizing the catalyst

A Ziegler-type catalyst comprising titanium on a magnesium chloride support that contains 16.0% by weight of Mg was pre-polymerized with propylene. The reaction took place in a vessel equipped with a stirrer to which hexane, TEAl and DPMS were added. The catalyst was added, and the mixture was agitated for a time sufficient to insure adequate contact between the catalyst, cocatalyst and electron donor. Propylene was gradually added to the vessel with agitation. Enough propylene was added so as to polymerize and coat the catalyst such that the weight ratio of the polymer coating/catalyst was in the range of 2–4. At the conclusion of propylene addition, the mixture was agitated for an additional period of time and then allowed to settle. The coated catalyst was separated from the unreacted material, inert solvent and other impurities using conventional solid-liquid separation techniques. As an optional step, the catalyst was washed with hexane or heptane in order to remove excess TEAl, and the catalyst was then slurried with hexane and placed into drums for storage and transport.

Pre-contacting and Polymerization Procedure

The pre-polymerized catalyst was first diluted in a mineral oil slurry. Approximately 1 ml of the catalyst slurry was diluted in mineral oil to 25 ml total volume in a "Vacuum Atmospheres" inert gas glove box. Typically, about 2.5-3.0 ml of the dilute slurry, or approximately 6 mg of raw catalyst, was injected in each polymerization run. The actual amount of catalyst used in the polymerization product for ppm $Mg^{+2}$ and by knowing the weight percentage of the Mg in the catalyst.

A two liter Zipperclave containing approximately 2 psig of nitrogen at 30° C. was used as a reaction vessel to which 1 mmol of TEAl, or half of the total mmols of TEAl for the run, was added. Approximately 65 ml of hydrogen gas was then added followed by 1,000 ml of propylene. The stirrer was set at 1200 rpm, and the reactor temperature was raised to 70° C. and the mixture was agitated for about an hour.

In a glove box under nitrogen purge, the remaining 1 mmol of TEAl of the 2 total mmols used and 0.1 mmol of DPMS, was added by syringe to a 75 ml sample cylinder containing 5 ml hexane. The sample cylinder was then taken into the inert gas glove box where approximately 3 ml of the catalyst/oil slurry was injected by syringe into the sample cylinder. The contents of the sample cylinder were then flushed to the Zipperclave reactor with 200 ml of propylene. The polymerization reaction continued for 2 hours after the addition of the catalyst at which point it was stopped. The polymer product was then collected and dried. The dried polymer was weighed to determine the yield. The isotactic indeces (II) were measured as the weight percent of the polymer insoluble in boiling heptane. The melt flow indeces (MI) were determined using the standard ASTM Method D 1238-82 for polypropylene (gms/10 minutes). The ppm of Mg was determined by atomic absorption. The efficiency of the catalyst in terms of gms of polymer/gm of catalyst in two hours was then calculated from the ppm of Mg and the reported weight percentage of Mg in the catalyst (16 wt %).

The efficiency of the catalyst obtained through using the above procedures was calculated to be 28,600 gms of polypropylene/gm of catalyst for 2 hours reaction time. The results are shown in Table 1.

COMPARATIVE EXAMPLE 1

The procedure was the same as in Example 1 except that there was no pre-contact of the pre-polymerized catalyst with the TEAl and DPMS. The 1.0 mmol TEAl and 0.1 mmol DPMS contacted in the sample chamber was flushed to the reactor with 200 ml of propylene which was followed immediately by the 3 ml of diluted catalyst. The efficiency of the catalyst without the pre-contacting was 21,900.

EXAMPLE 2

The procedures of Example 1 were followed except that all of the TEAl used in the reaction, 2 mmols, was added to the sample chamber instead of half to the reactor and half to the sample chamber. The TEAl, DPMS and hexane were contacted for 10 minutes in the sample chamber before addition of the catalyst. The catalyst was added and 5 minutes later the contents of the sample chamber were flushed to the reactor with 200 ml of propylene. The efficiency was calculated to be 25,000.

EXAMPLE 3

The procedures of Example 1 were repeated. The efficiency was calculated to be 29,600.

EXAMPLE 4

The procedures of Example 1 were repeated except that 2.7 ml of catalyst slurry was injected into the sample chamber and was pre-contacted for about 5 minutes before being charged to the reactor. The calculated efficiency was 27,600.

EXAMPLE 5

The procedures of Example 1 were repeated except that the total amount of TEAl used was 1.2 mmol and the total amount of DPMS used was 0.062 mmol. One-half of the total TEAl and DPMS used was added to the reactor at 30° C. The other one-half of the TEAl and DPMS was pre-contacted with the catalyst in the sample cylinder and then charged to the reactor. The amount of catalyst slurry used was 2.5 ml. The calculated catalyst efficiency was 29,600.

COMPARATIVE EXAMPLE 5

The procedures of Example 5 were followed except that all of the TEAl and DPMS was added to the reactor at 30° C. and there was no pre-contact with the catalyst. The efficiency was calculated to be 20,600.

EXAMPLE 6

The procedures of Example 5 were followed except for the total amount of TEAl used was 0.2 mmol and the total amount of DPMS was 0.01 mmol. The calculated efficiency was 14,000.

COMPARATIVE EXAMPLE 6

The procedures of Example 6 were followed except that all of the TEAl and DPMS was charged to the reactor at 30° C. with no pre-contact with the catalyst. The calculated efficiency of the catalyst was 8,500.

EXAMPLE 7

The procedures of Example 5 were repeated except for the total amount of TEAl used was 1.0 mmol and the total amount of DPMS was 0.1 mmol. The Al/DPMS ratio was 10. The resulting efficiency of the catalyst was calculated to be 26,200.

COMPARATIVE EXAMPLE 7

The procedures of Example 7 were repeated except that all of the TEAl and DPMS was charged to the reactor at 30° C. and there was no pre-contact with the catalyst. The efficiency was calculated to be 19,800.

EXAMPLE 8

The procedures of Example 5 were repeated except for the total amount of TEAl used was 0.62 mmol and the total amount of DPMS used was 0.062. Also, 2.7 ml of catalyst slurry was used. The calculated efficiency was 26,700.

COMPARATIVE EXAMPLE 8

The procedures and amounts of Example 8 were used except that all of the TEAl and DPMS was charged to the reactor at 30° C. with there being no pre-contact with the catalyst. The catalyst efficiency was calculated to be 18,000.

EXAMPLE 9

The procedures of Example 5 were repeated except that the total amount of TEAl used was 0.4 mmol and the total amount of DPMS used 0.062 mmol. The TEAl/DPMS ratio was 6.45. The calculated efficiency was 22,500.

COMPARATIVE EXAMPLE 9

The same procedures and amounts as used in Example 9 were repeated except there was no pre-contact with the catalyst as all the TEAl and DPMS was added to the reactor at 30° C. The efficiency was calculated to be 18,000.

EXAMPLE 10

The procedures of Example 5 were repeated except that the total amount of TEAl used was 2.0 mmol and the total amount of DPMS used was 1.67 mmol. The TEAl/DMPS ratio was 1.2. The efficiency was calculated to be 24,600.

COMPARATIVE EXAMPLE 10

The procedures of Example 10 were followed except that there was no pre-contact with the catalyst as all the TEAl and DPMS was added to the reactor at 30° C. The efficiency was 16,700.

EXAMPLE 11

The procedures of Example 5 were followed except that the total amount of TEAl used was 0.6 mmol and the total amount of DPMS used was 0.5 mmol. The amount of catalyst slurry used was 2.7 ml. The resultant efficiency was calculated to be 24,200.

COMPARATIVE EXAMPLE 11

The procedures of Example 11 were followed except that there was no pre-contact of the catalyst as all of the TEAl and DPMS was added to the reactor at 30° C. The efficiency was found to be 15,500.

EXAMPLE 12

The procedures of Example 5 were followed except that the total amount of TEAl used was 0.4 mmol and the total amount of DPMS used was 0.33. The calculated efficiency was 18,000.

COMPARATIVE EXAMPLE 12

The procedures of Example 12 were repeated except that there was no pre-contact with the catalyst as all the TEAl and DPMS was added to the reactor at 30° C. The efficiency was reported to be 12,700.

EXAMPLE 13

The procedures of Example 5 were followed except that the total amount of TEAl used was 0.2 mmol and the total amount of DPMS used was 0.17 mmol. The efficiency was found to be only 3,700.

COMPARATIVE EXAMPLE 13

The procedures of Example 13 were followed except that there was no pre-contact with the catalyst as all the TEAl and DPMS was added to the reactor at 30° C. The efficiency was calculated to be 3,600.

The results of the foregoing Examples and Comparative Examples are summarized in Table 1.

TABLE 1

| Examples | TEAl (mmol) | DPMS (mmol) | TEAl/ DPMS | Yield of Polymer (gms) | Mg ppm | Efficiency gms/gm-2 hr | Isotactic Index (wt %) | Melt Flow Index g/10 min |
|---|---|---|---|---|---|---|---|---|
| 1 | 2.00 | 0.1 | 20 | 234 | 5.6 | 28,600 | 96.9 | 7 |
| Comparative 1 | 2.00 | 0.1 | 20 | 176 | 7.3 | 21,900 | 96.6 | 6 |
| 2 | 2.00 | 0.1 | 20 | 173 | 6.4 | 25,000 | 97.5 | 8 |
| 3 | 2.00 | 0.1 | 20 | 182 | 5.4 | 29,600 | 97.5 | 6 |
| 4 | 2.00 | 0.1 | 20 | 189 | 5.8 | 27,600 | 97.8 | 4 |
| 5 | 1.20 | 0.062 | 20 | 225 | 5.4 | 29,600 |  | 7 |
| Comparative 5 | 1.20 | 0.062 | 20 | 157 |  | 20,600 |  |  |
| 6 | 0.20 | 0.01 | 20 | 124 | 11.4 | 14,000 | 95.4 | 6 |
| Comparative 6 | 0.20 | 0.01 | 20 | 69 | 18.8 | 8,500 | 95.6 | 7 |
| 7 | 1.0 | 0.1 | 10 | 225 | 6.1 | 26,200 | 97.6 | 5 |
| Comparative 7 | 1.0 | 0.1 | 10 | 151 | 8.1 | 19,800 | 97.5 | 1 |
| 8 | 0.62 | 0.062 | 10 | 158 | 6.0 | 26,700 | 97.5 | 4 |
| Comparative 8 | 0.62 | 0.062 | 10 | 96 | 8.9 | 18,000 | 96.3 | 7 |
| 9 | 0.4 | 0.062 | 6.45 | 180 | 7.2 | 22,200 | 98.1 | 3 |
| Comparative 9 | 0.4 | 0.062 | 6.45 | 133 | 8.9 | 18,000 | 97.6 | 3 |
| 10 | 2.0 | 1.67 | 1.2 | 186 | 6.5 | 24,600 | 97.9 | 5 |
| Comparative 10 | 2.0 | 1.67 | 1.2 | 138 | 9.6 | 16,700 | 97.9 | 5 |
| 11 | 0.6 | 0.5 | 1.2 | 173 | 6.6 | 24,200 | 97.3 | 5 |
| Comparative 11 | 0.6 | 0.5 | 1.2 | 97 | 10.3 | 15,500 | 96.1 | 3 |
| 12 | 0.4 | 0.33 | 1.2 | 164 | 8.9 | 18,000 | 97.8 | 5 |
| Comparative 12 | 0.4 | 0.33 | 1.2 | 100 |  | 12,700 |  |  |
| 13 | 0.2 | 0.17 | 1.2 | 26 | 43.2 | 3,700 |  |  |
| Comparative 13 | 0.2 | 0.17 | 1.2 | 26 | 44.2 | 3,600 |  |  |

We claim:

1. In the continuous polymerization of olefins, the process comprising:
   (a) establishing a fluid carrier stream containing a co-catalyst;
   (b) adding a pre-polymerized catalyst to the carrier stream, said catalyst being a complex derived from a transition metal halide and a metal hydride or metal alkyl;
   (c) allowing the catalyst and co-catalyst to contact in said carrier stream for a time sufficient to increase the efficiency of the catalyst; and
   (d) introducing the carrier stream containing the catalyst and co-catalyst into a polymerization reaction zone containing an olefin monomer.

2. The process of claim 1, wherein the time of contact between the catalyst and co-catalyst in the carrier stream prior to introducing the stream and the catalyst into the reaction zone is less than one minute.

3. The process of claim 1, wherein the time of contact between the catalyst and co-catalyst in the carrier stream prior to introducing the stream and the catalyst into the reaction zone is less than 10 seconds.

4. The process of claim 1, wherein the pre-polymerized catalyst has a polymeric coating, and the weight ratio of the polymeric coating to the catalyst is less than about 10 to 1.

5. The process of claim 1, wherein the fluid carrier stream consists of a dilute solution of co-catalyst.

6. The process of claim 1, wherein the co-catalyst is an alkyl aluminum compound.

7. The process of claim 1, wherein the fluid carrier stream contains an electron donor compound.

8. In the continuous polymerization of olefins, the process comprising:
   (a) establishing a fluid carrier stream containing a co-catalyst;
   (b) adding a pre-polymerized catalyst to the carrier stream, said catalyst being a complex derived from a transition metal halide and a metal hydride or a metal alkyl;
   (c) adding an electron donor compound to the carrier stream;
   (d) allowing the pre-polymerized catalyst to contact the co-catalyst and electron donor for a time sufficient to increase the efficiency of the catalyst; and
   (e) introducing said carrier stream containing the catalyst, co-catalyst and electron donor into a polymerization reaction zone containing an olefin monomer.

9. The process of claim 1, wherein the time of contact between the pre-polymerized catalyst and co-catalyst prior to introducing the carrier stream into the reaction zone is less than 1 minute.

10. The process of claim 8, wherein the time of contact between the pre-polymerized catalyst and co-catalyst prior to introducing the carrier stream into the reaction zone is less than 10 seconds.

11. The process of claim 8, wherein the co-catalyst is triethylaluminum.

12. The process of claim 8, wherein the electron donor is an organic silicon compound.

13. The process of claim 8, wherein the fluid carrier stream is a dilute solution of co-catalyst.

14. The process of claim 8, wherein the pre-polymerized catalyst has a polymeric coating and the weight ratio of the polymeric coating to the catalyst is less than about 10 to 1.

15. A process for increasing the efficiency of a catalyst used in the polymerization of olefins, comprising:
   (a) pre-polymerizing the catalyst by contacting the catalyst with a co-catalyst, an electron donor and an olefin monomer;
   (b) washing said catalyst with an organic solvent;
   (c) establishing a fluid carrier stream containing an alkyl aluminum co-catalyst;
   (d) adding said catalyst to said stream and allowing the catalyst to contact the co-catalyst in the stream for a time sufficient to increase the efficiency of the catalyst; and
   (e) introducing the carrier stream containing the catalyst and co-catalyst into a polymerization reaction zone containing an olefin monomer.

16. The process of claim 15, wherein the co-catalyst is a triethylaluminum compound.

17. The process of claim 15, wherein the carrier stream includes an electron donor compound.

18. The process of claim 17, wherein the electron donor is an organic silicon compound.

19. The process of claim 15, wherein the step of pre-polymerizing the catalyst results in a catalyst coated with a polymeric coating and having a weight ratio of polymer coating to catalyst of less than about 10 to 1.

20. The process of claim 15, wherein the time of contact between the catalyst and co-catalyst in the carrier stream prior to introducing the stream and the catalyst into the reaction zone is less than 10 seconds.

21. A process for increasing the efficiency of a catalyst used in the polymerization of olefins, comprising:
   (a) pre-polymerizing the catalyst by contacting the catalyst with a co-catalyst, an electron donor and an olefin monomer;
   (b) washing said catalyst with an organic solvent;
   (c) establishing a fluid carrier stream containing an alkyl aluminum co-catalyst;
   (d) adding the pre-polymerized catalyst to said stream and allowing the catalyst to contact the co-catalyst in the stream for a time sufficient to increase the efficiency of the catalyst;
   (e) adding an electron donor to the carrier stream; and
   (f) introducing the carrier stream into a polymerization reaction zone containing an olefin monomer.

22. The process of claim 21, wherein the co-catalyst is a triethylaluminum compound.

23. The process of claim 21, wherein the electron donor is an organic silicon compound.

24. The process of claim 21, wherein the step of pre-polymerizing the catalysts results in a catalyst coated with a polymeric coating and having a weight ratio of polymer coating to catalyst of less than about 10 to 1.

25. The process of claim 21, wherein the time of contact between the catalyst and co-catalyst in the carrier stream prior to introducing the stream and catalyst into the reaction zone is less than 10 seconds.

26. In the continuous polymerization of olefins, the process comprising:
   (a) establishing a fluid carrier stream containing a co-catalyst;
   (b) adding a pre-polymerized catalyst to the carrier stream, said catalyst being a complex derived from a transition metal halide and a metal hydride or metal alkyl;
   (c) allowing the catalyst and co-catalyst to contact in said carrier stream for a time sufficient to increase the efficiency of the catalyst;
   (d) introducing the carrier stream containing the catalyst and co-catalyst into a polymerization reaction zone containing an olefin monomer; and
   (e) concomittantly with step (d) adding an additional amount of said pre-polymerized catalyst into said carrier stream in accordance with step (b) and thereafter repeating steps (c) and (d) with respect to said additional amount of pre-polymerized catalyst.

27. The process of claim 26, wherein said additional amount of pre-polymerized catalyst is added to said carrier stream in accordance with step (e) in a continuous manner.

28. The process of claim 26, wherein said olefin monomer is propylene.

29. The method of claim 28, wherein said co-catalyst is triethylaluminum and wherein said pre-polymerized catalyst comprises titanium on a magnesium chloride support.

30. The process of claim 29, further comprising adding an electron donor compound to said carrier stream.

31. The process of claim 30, wherein said electron donor compound is diphenyldimethoxysilane.

* * * * *